(12) United States Patent
Kim et al.

(10) Patent No.: US 11,785,621 B2
(45) Date of Patent: Oct. 10, 2023

(54) PHYSICAL DOWNLINK CONTROL CHANNEL (PDCCH) MONITORING FOR REDUCED CAPABILITY USER EQUIPMENT (UE)

(71) Applicant: QUALCOMM Incorporated, San Diego, CA (US)

(72) Inventors: Yuchul Kim, San Diego, CA (US); Huilin Xu, Temecula, CA (US); Hwan Joon Kwon, San Diego, CA (US); Peter Pui Lok Ang, San Diego, CA (US); Jing Lei, San Diego, CA (US); Iyab Issam Sakhnini, San Diego, CA (US); Krishna Kiran Mukkavilli, San Diego, CA (US); Wanshi Chen, San Diego, CA (US); Tingfang Ji, San Diego, CA (US); Muhammad Sayed Khairy Abdelghaffar, San Jose, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/377,082

(22) Filed: Jul. 15, 2021

(65) Prior Publication Data
US 2022/0053479 A1     Feb. 17, 2022

Related U.S. Application Data

(60) Provisional application No. 63/066,787, filed on Aug. 17, 2020.

(51) Int. Cl.
*H04W 72/51*    (2023.01)
*H04W 72/23*    (2023.01)
*H04W 72/0446*  (2023.01)

(52) U.S. Cl.
CPC .......... *H04W 72/51* (2023.01); *H04W 72/23* (2023.01); *H04W 72/0446* (2013.01)

(58) Field of Classification Search
CPC .............................. H04W 72/23; H04W 72/51
USPC ......................................................... 370/336
See application file for complete search history.

(56) References Cited

U.S. PATENT DOCUMENTS

2015/0372796 A1* 12/2015 Lee ........................ H04L 5/0073
370/329

* cited by examiner

*Primary Examiner* — Angel T Brockman
(74) *Attorney, Agent, or Firm* — Seyfarth Shaw LLP

(57) ABSTRACT

A method for wireless communication performed by a user equipment (UE) includes transmitting, to a base station, an indication comprising a per slot capability for a first number of physical downlink control channel (PDCCH) blind decodes and a first number of control channel elements (CCEs). The method also includes receiving, from the base station, a search space configuration based on the indication. The search space configuration configures a second number of blind decodes per slot, a second number of CCEs per slot, and a PDCCH monitoring periodicity. The method also includes decoding a PDCCH based on the search space configuration.

30 Claims, 6 Drawing Sheets

PDCCH Monitoring Periodicity

| | 1 | 2 | 3 |
|---|---|---|---|
| N*0.33 | 0.8 | 0.65 | 0.41 |
| N*0.5 | 0.85 | 0.65 | 0.58 |
| N*1 | 1 | 0.725 | 0.63 |

Number of Blind Decodes per Slot

*FIG. 4*

PHYSICAL DOWNLINK CONTROL CHANNEL (PDCCH) MONITORING FOR REDUCED CAPABILITY USER EQUIPMENT (UE)

CROSS-REFERENCE TO RELATED APPLICATION

The present application claims the benefit of U.S. Provisional Patent Application No. 63/066,787, filed on Aug. 17, 2020, and titled "PHYSICAL DOWNLINK CONTROL CHANNEL (PDCCH) MONITORING FOR REDUCED CAPABILITY USER EQUIPMENT (UE)," the disclosure of which is expressly incorporated by reference in its entirety.

FIELD OF THE DISCLOSURE

Aspects of the present disclosure generally relate to wireless communications, and more particularly to techniques and apparatuses for reducing physical downlink control channel (PDCCH) monitoring for reduced capability (RedCap) user equipment (UE).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communication performed by a user equipment (UE) includes transmitting, to a base station, an indication having a per slot capability for a number of physical downlink control channel (PDCCH) blind decodes and a number of control channel elements (CCEs). The method further includes receiving, from the base station, a search space configuration based on the indication. The search space configuration configures a second number of blind decodes per slot, a second number of CCEs per slot, and a PDCCH monitoring periodicity. The method still further includes decoding a PDCCH based on the search space configuration.

In aspects of the present disclosure, a method for wireless communication performed by a base station includes receiving, from a user equipment (UE), an indication having a per slot capability for a number of physical downlink control channel (PDCCH) blind decodes and a number of control channel elements (CCEs). The method further includes configuring, based on the indication, a search space configuration including a second number of blind decodes per slot, a second number of CCEs per slot, and a PDCCH monitoring periodicity for a search space. The method still further includes transmitting, to the UE, a PDCCH based on the search space configuration.

Other aspects of the present disclosure are directed to an apparatus for wireless communications performed by a user equipment (UE) having a processor, memory coupled with the processor and instructions stored in the memory. When the instructions are executed by the processor, the apparatus transmits, to a base station, an indication comprising a per slot capability for a number of physical downlink control channel (PDCCH) blind decodes and a number of control channel elements (CCEs). The apparatus also receives, from the base station, a search space configuration based on the indication. The search space configuration configures a second number of blind decodes per slot, a second number of CCEs per slot, and a PDCCH monitoring periodicity. The apparatus further decodes a PDCCH based on the search space configuration.

Still other aspects of the present disclosure are directed to an apparatus for wireless communications performed by a base station having a processor, memory coupled with the processor and instructions stored in the memory. When the instructions are executed by the processor, the apparatus receives, from a user equipment (UE), an indication comprising a per slot capability for a number of physical downlink control channel (PDCCH) blind decodes and a number of control channel elements (CCEs). The apparatus also configures, based on the indication, a search space configuration including a second number of blind decodes per slot, a second number of CCEs per slot, and a PDCCH monitoring periodicity for a search space. The apparatus further transmits, to the UE, a PDCCH based on the search space configuration.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 4 is a block diagram illustrating power consumption values based on a number of blind decodes and physical downlink control channel (PDCCH) monitoring periodicity, in accordance with aspects of the present disclosure.

DETAILED DESCRIPTION

Figure 1:
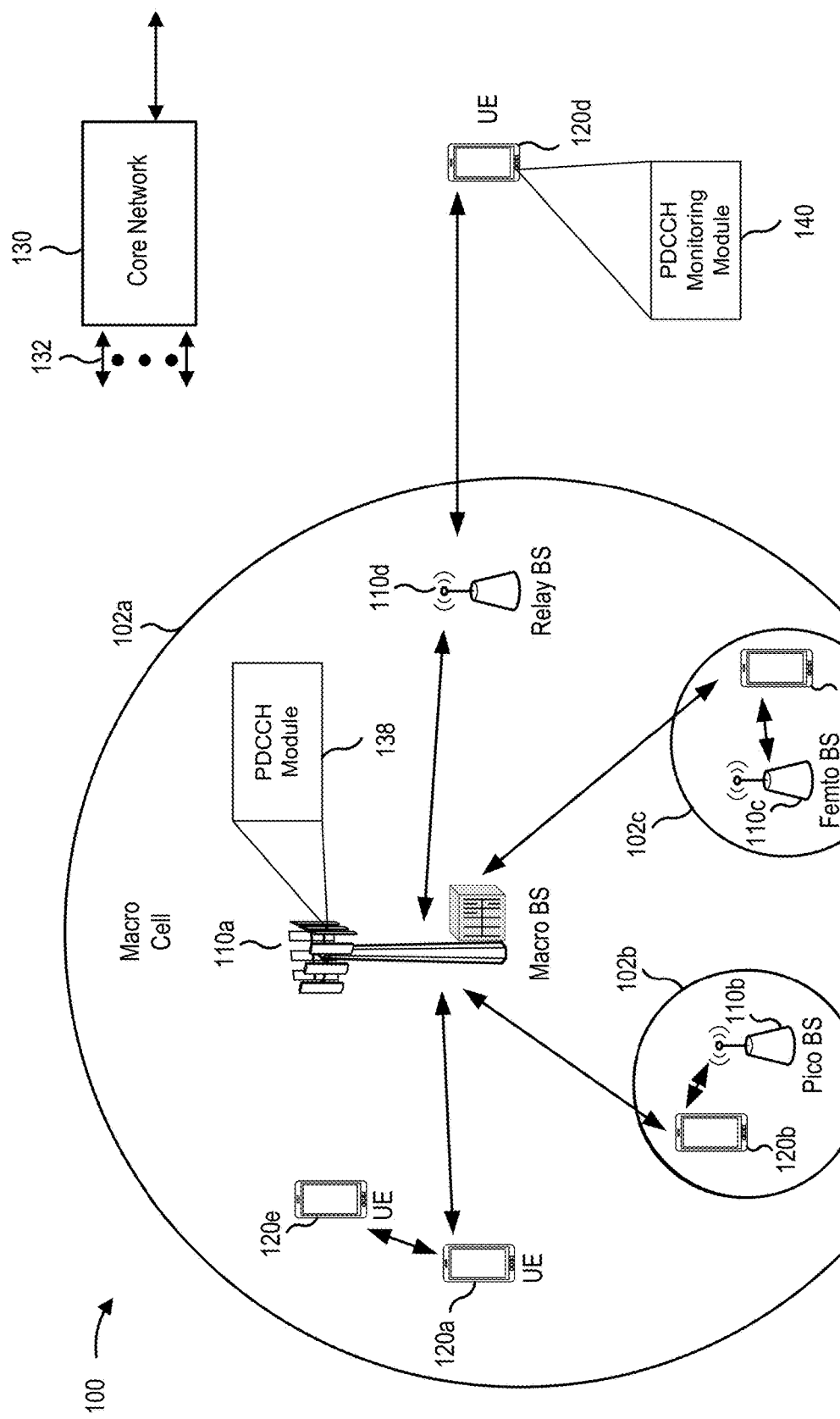
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A user equipment (UE) may monitor a search space, such as a common search space or a UE-specific search space, in a control region for a physical downlink control channel (PDCCH). A search space may include a set of channel control element (CCE) locations, and the UE may attempt to decode the PDCCH in the set of CCE locations. Still, the exact location of the PDCCH is unknown to the UE. Therefore, the UE blindly decodes PDCCHs until successfully decoding a PDCCH designated for the UE. A maximum number of PDCCH candidates and a maximum number of CCEs per slot may be predefined.

Blind decoding may increase the UE's hardware complexity and power use. It may be desirable to reduce hardware complexity and power use. Specifically, reduced hardware complexity and power use is expressly specified for some types of UEs, such as, for example, wireless sensors, surveillance devices, and wearable devices. These UEs may be referred to as reduced capability (RedCap) UEs. Aspects of the present disclosure are directed to improving UE power consumption and reducing hardware complexity by reducing both a number of allowed blind decodes and a number of CCEs in a search space.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a PDCCH monitoring module 140. For brevity, only one UE 120d is shown as including the PDCCH monitoring module 140. The PDCCH monitoring module 140 may transmit, to a base station, an indication comprising a per slot capability for a first number of PDCCH blind decodes and a first number of control channel elements (CCEs). The PDCCH monitoring module 140 may also receive, from the base station, a search space configuration based on the indication, the search space configuration configuring a second number of blind decodes per slot, a second number of CCEs per slot, and a PDCCH monitoring periodicity. The PDCCH monitoring module 140 may further decode a PDCCH based on the search space configuration.

The core network 130 or the base stations 110 may include a PDCCH module 138 for receiving, from a UE, an indication comprising a per slot capability for a first number of PDCCH blind decodes and a first number of control channel elements (CCEs). The PDCCH module 138 may also configure, based on the indication, a second number of blind decodes per slot, a second number of CCEs per slot, and a PDCCH monitoring periodicity for a search space. The PDCCH module 138 may further transmit, to the UE, a PDCCH based on the search space configuration.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
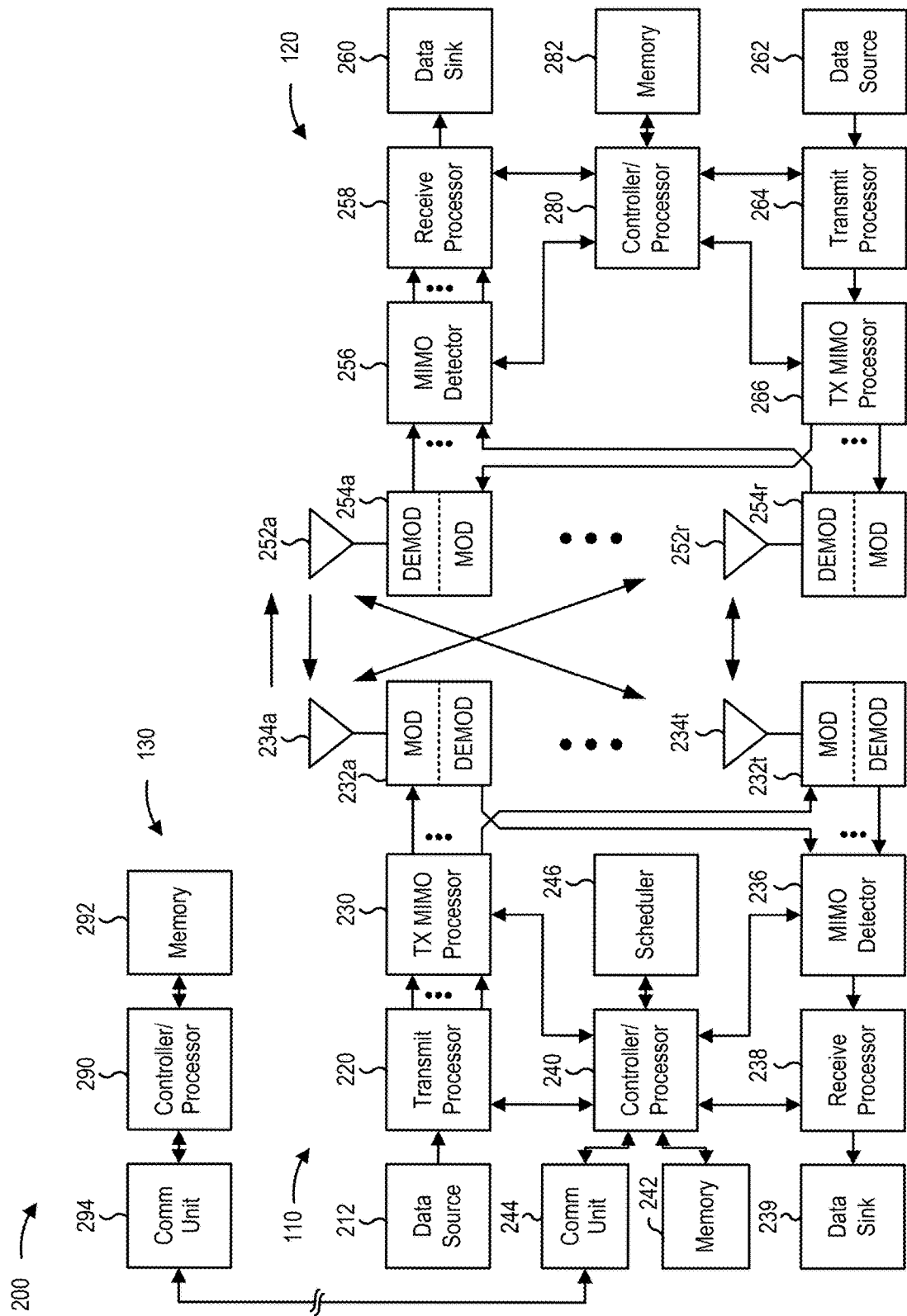
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with reducing both a number of blind decodes and CCEs as described in more detail elsewhere. For example, the controller/processor 240 of the base station 110, the controller/processor 280 of the UE 120, and/or any other component(s) of FIG. 2 may perform or direct operations of, for example, the process of FIGS. 5-6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for transmitting, means for receiving, means for decoding, means for receiving, and means for configuring. Such means may include one or more components of the UE 120 or base station 110 described in connection with FIG. 2.

As indicated above, FIG. 2 is provided merely as an example. Other examples may differ from what is described with regard to FIG. 2.

For Third Generation Partnership Project (3GPP) Release 17 and beyond, various enhancements and modifications are specified to reduce user equipment (UE) complexity, capability, and/or power consumption. UEs with reduced complexity, capability, and/or power consumption may be referred to as reduced capability (RedCap) UEs. Reduced capability UEs may be specified for different use cases, such as wireless sensors, surveillance devices (e.g., video surveillance), and wearable devices.

Various methods may be specified for reducing a UE's complexity, capability, and/or power consumption. In some examples, physical downlink control channel (PDCCH) monitoring may be limited (e.g., reducing a number of blind decodes and control channel elements (CCEs)). Additionally, or alternatively, discontinuous reception (DRX) for radio resource control (RRC) inactive and/or idle states may be extended. Furthermore, radio resource management (RRM) may be relaxed for stationary devices. These limitations may be present in RedCap devices and/or devices operating with very short slot lengths at a higher frequency band.

As described above, a UE may monitor a search space, such as a common search space or a UE-specific search space, in a control region for a PDCCH. The search space may include a set of CCE locations, and the UE may attempt to decode the PDCCH in the set of CCE locations. Still, the exact location of the PDCCH is unknown to the UE. Therefore, the UE blindly decodes PDCCHs until successfully decoding a PDCCH designated for the UE. A maximum number of PDCCH candidates and a maximum number of CCEs per slot may be predefined. Blind decoding may increase the UE's hardware complexity as well as increase power use. It may be desirable to reduce hardware complexity and power use. Specifically, reduced hardware complexity and power use is expressly specified for some types of UEs, such as, for example, wireless sensors, surveillance devices, and wearable devices. These UEs may be referred to as reduced capability (RedCap) UEs. For ease of explanation, in the current disclosure, a UE that is not designated as a reduced capability UE may be referred to as a full capability UE. Aspects of the present disclosure are directed to improving UE power consumption and reducing hardware complexity by reducing both the number of blind decodes and CCEs.

For PDCCH candidate decoding, the 3GPP specification defines a maximum number of blind decodes and a maximum number of CCEs in a search space for a UE. For example, according to the 3GPP specification, for a subcarrier spacing configuration zero in a single serving cell, the maximum number of monitored PDCCHs per slot is forty-four (see 3GPP TS 38.213 R15 table 10.1-2). That is, a UE may perform a maximum of forty-four blind decodes per slot. Additionally, for the subcarrier spacing configuration zero for the single service cell, the maximum number of non-overlapped CCEs per slot may be limited to fifty-six (see 3GPP TS 38.213 R15 table 10.1-3). 5G new radio (NR) defines a frame to be ten milliseconds (ms) in duration. Each frame is divided into ten subframes of one ms each. The one ms subframe is then divided into one or more slots in 5G. Thus, over a period of one second, the UE may receive one thousand slots. For the subcarrier spacing configuration zero, with a maximum of forty-four blind decodes per slot, the UE may perform forty-four thousand blind decodes over a period of one second.

As described, although the 3GPP specification specifies a limit for a maximum number of blind decodes and CCEs per slot for a reduced capability UE, it may be desirable to further reduce the number of blind decodes and CCEs per slot.

In some configurations, for reduced capability UEs, a maximum number of blind decodes and CCEs per slot is defined in the 3GPP specification. The maximum number of blind decodes and CCEs per slot specified for reduced capability UEs may be less than the maximum number of blind decodes and CCEs per slot specified for full capability UEs.

In other configurations, the number of blind decodes and CCEs may be limited based on UE capability signaling. In these configurations, the UE indicates a supported maximum number of blind decodes and CCEs. The indicated capability for the blind decodes and CCEs may be referred to as a reduced number of blind decodes and CCEs. The reduced number may be different from (e.g., less than) a maximum number defined in the 3GPP specification. In some configurations, different sets of blind decode and CCE limit values are predefined, and the UE may identify one of the multiple sets as the UE capability. Additionally, in these configurations, the number of blind decodes and CCEs configured by a base station (e.g., gNB) for a search space may be limited by the UE capability signaling.

In some implementations, the blind decode and CCE limit is interpreted by the base station as a per slot limit. For example, the blind decode limit indicated based on UE capability signaling or the predefined limit may be twenty-two. In this implementation, the base station may interpret the limit as twenty-two blind decodes per slot.

In other implementations, the blind decode and CCE limit is interpreted as an average. In these implementations, a number of blind decodes or CCEs may peak above the indicated average for one or more slots. Still, an average number of blind decodes and CCEs over a period of slots does not exceed the limit indicated based on UE capability signaling or the predefined limit. For example, the blind decode limit indicated based on UE capability signaling or the predefined limit may be twenty-two. In this implementation, the base station may configure a search space for forty-four blind decodes for even-numbered slots, and zero blind decodes for odd-numbered slots. In this example, an average number of blind decodes over two consecutive slots is twenty-two per slot, thus satisfying the UE limit.

An amount of power reduced at the UE based on interpreting the limit as an average over a number of slots may be greater than an amount of power reduced at the UE based on interpreting the limit as a maximum per slot. As described above, in one example, the blind decode limit indicated based on UE capability signaling or the predefined limit may be twenty-two. In a first example, the base station configures the search space to limit a number of blind decodes performed by the UE to twenty-two blind decodes per slot. In a second example, the base station configures the search space to limit a number of blind decodes to forty-four in even slots, and a number of blind decodes to zero in odd slots. In examples one and two, the UE may perform the same number of blind decodes (e.g., twenty-two) on average. Still, the UE consumes less power in the second example.

Interpreting the limit on blind decodes and CCEs as a per slot maximum may be referred to as a per slot blind decode/CCE limit. Additionally, interpreting the limit on blind decodes and CCEs as an average over a number of slots may be referred to as an average blind decode/CCE limit.

Figure 3A:
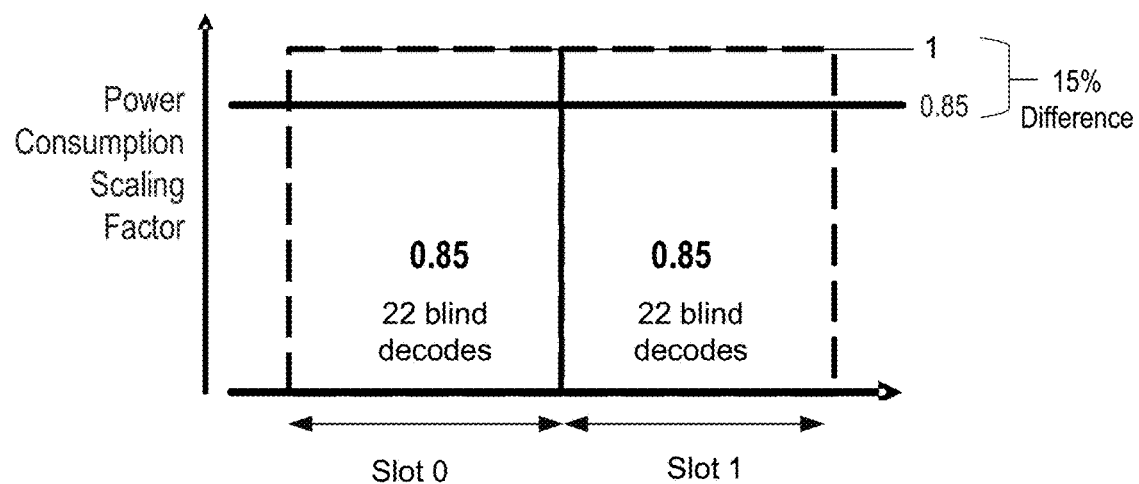
FIG. 3A is a table showing a reduced maximum number of blind decodes with continuous physical downlink control channel (PDCCH) monitoring, in accordance with aspects of the present disclosure.

FIG. 3A is a graph showing an example of an amount of power consumed for a reduced number of blind decodes for continuous physical downlink control channel (PDCCH) monitoring, in accordance with aspects of the present disclosure. In the example of FIG. 3A, for a reduced capability UE, the blind decode limit indicated based on UE capability signaling or the predefined limit may be twenty-two. Additionally, in this example, it is assumed a maximum number of blind decodes specified for a full capability UE is forty-four. For the example of FIG. 3A, the base station interprets the limit as a per slot maximum. For illustrative purposes, a power consumption for blindly decoding forty-four PDCCHs per slot (e.g., the maximum number of blind decodes) is one. As shown in FIG. 3A, when a number of blind decodes per slot is reduced from forty-four per slot to twenty-two per slot, a power consumption of the UE is reduced by fifteen percent per slot (shown as a scaled power of 0.85). That is, in the example of FIG. 3A, for the reduced number of blind decodes, the UE consumes 85% of the power used for the maximum number of blind decodes.

Figure 3B:
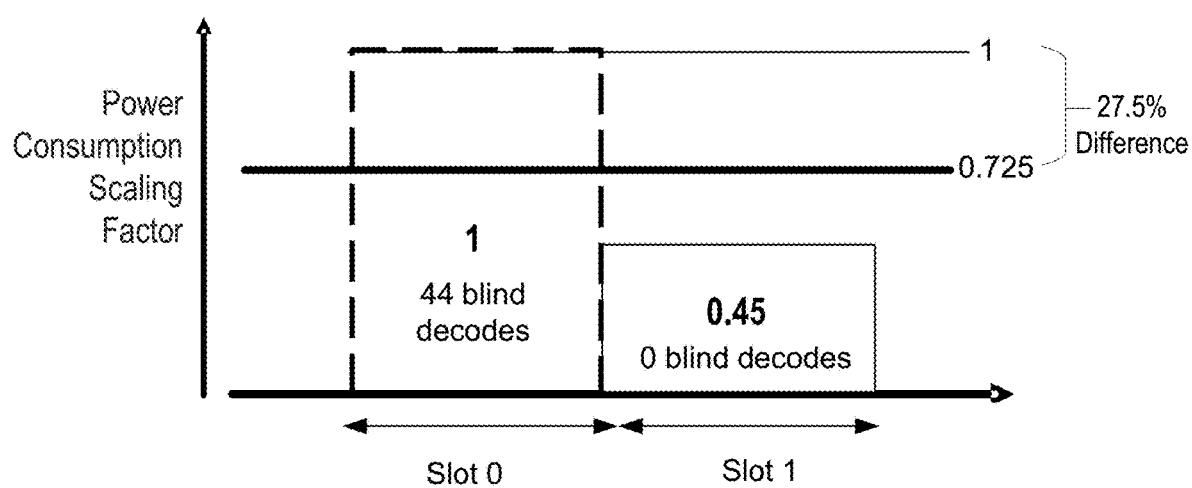
FIG. 3B is a graph showing a reduced average number of blind decodes with non-continuous physical downlink control channel (PDCCH) monitoring, in accordance with aspects of the present disclosure.

FIG. 3B is a graph showing an example of an amount of power consumed for a reduced number of blind decodes for non-continuous PDCCH monitoring, in accordance with aspects of the present disclosure. In the example of FIG. 3B, for a reduced capability UE, the blind decode limit indicated based on UE capability signaling or the predefined limit may be twenty-two. Additionally, in this example, it is assumed a maximum number of blind decodes specified for a full capability UE is forty-four. For the example of FIG. 3B, the base station interprets the limit as an average over a number of slots, where the PDCCH monitoring periodicity is two (e.g., PDCCH is monitored once every two slots). For illustrative purposes, a power consumption for blindly decoding forty-four PDCCHs per slot (e.g., the maximum number of blind decodes) is one.

As shown in FIG. 3B, the base station may configure the search space of the UE for forty-four blind decodes in even slots and zero blind decodes in odd slots. In the example of FIG. 3B, for the even slot (slot 0), the power consumption remains the same as the power consumption for the maximum number of blind decodes. Additionally, in this example, for the odd slot (slot 1), the power consumption is reduced by fifty-five percent (shown as a scaled power of 0.45). That is, in the example of FIG. 3B, for the reduced number of blind decodes in the odd slot, the UE consumes 45% of the power used for the maximum number of blind decodes. Furthermore, in the example of FIG. 3B, an average power consumed over a span of two slots is reduced by twenty-seven and a half percent (shown as scaled power of 0.725). The number of blind decodes of FIG. 3B are provided as an example. Aspects of the present disclosure are not limited to forty-four blind decodes in even slots and zero blind decodes in odd slots. Different blind decode values and periodicities are contemplated.

In the example of FIG. 3A, the amount of power consumed by the UE over two slots is 85% of the power used for the maximum number of blind decodes. Additionally, in the example of FIG. 3B, the power consumed by the UE over two slots is 72.5% of the power used for the maximum number of blind decodes.

FIG. 4 is a block diagram illustrating power consumption values based on a number of blind decodes and PDCCH monitoring periodicity, in accordance with aspects of the present disclosure. In the example of FIG. 4, N is a number of blind decodes per slot, where (N*1) is a maximum number of blind decodes. As such, (N*0.5) is one-half of a number of the maximum number of blind decodes per slot, and (N*0.33) is one-third of the number of the maximum number of blind decodes per slot. Additionally, in the example of FIG. 4, a periodicity may be configured for the blind decoding. For example, the periodicity may be one (e.g., PDCCH is blindly decoded at every slot), two (e.g., PDCCH is blindly decoded once every two slots), and three (e.g., PDCCH is blindly decoded once every three slots).

As shown in FIG. 4, for a periodicity of one, a UE power consumption for a maximum number of blind decodes per slot is one, the UE power consumption for one-half of a number of the maximum number of blind decodes per slot is 0.85 (e.g., 15% reduction), and the UE power consumption for one-third of the number of the maximum number of blind decodes per slot is 0.8.

Additionally, in the example of FIG. 4, for a periodicity of two, the UE power consumption for a maximum number of blind decodes per slot is 0.725, the UE power consumption for one-half of a number of the maximum number of blind decodes per slot is 0.65, and the UE power consumption for one-third of the number of the maximum number of blind decodes per slot is 0.65. The example of FIG. 3B is an example of a maximum number of blind decodes per slot with a periodicity of two, such that an average over two slots is reduced.

Finally, in the example of FIG. 4, for a periodicity of three, the UE power consumption for a maximum number of blind decodes per slot is 0.63, the UE power consumption for one-half of a number of the maximum number of blind decodes per slot is 0.58, and the UE power consumption for one-third of the number of the maximum number of blind decodes per slot is 0.41.

As shown in FIG. 4, reducing an average maximum number of blind decodes over a number of slots (e.g., periodicity of two or three) provides a greater power reduction in comparison to reducing a number of blind decodes on a per slot basis. The periodicities shown in FIG. 4 are examples of periodicities. Aspects of the present disclosure may consider other periodicities.

As described, in some configurations, a base station (e.g., gNB) configures search spaces according to the blind decode limit, and CCE limit indicated based on UE capability signaling as well as a PDCCH monitoring periodicity. The PDCCH monitoring periodicity identifies a slot periodicity for attempting to decode the PDCCH. In some configurations, the blind decode limit and CCE limit indicated by the UE according to the UE's capability may be considered average limits of a number of slots, where the number of slots may be determined based on the PDCCH monitoring periodicity. For example, if the PDCCH monitoring periodicity is two, the number of slots for determining the average is two. Based on all the search space configurations configured by the base station, an average number of blind decodes and CCEs per slot is less than or equal to the values indicated based on UE capability signaling.

As an example, a UE may indicate a reduced average limit of twenty-two blind decodes per slot and twenty-eight CCEs per slot. The base station may select a search space configuration from multiple search space configurations. For example, a first search space configuration specifies forty-four blind decodes, fifty-six CCEs, and a PDCCH monitoring periodicity may be set to two. The first search space configuration provides an average of twenty-two blind decodes and twenty-eight CCEs over a period of two slots. In this example, a second search space configuration may specify twenty-two blind decodes per slot, twenty-eight CCEs per slot, and the PDCCH monitoring periodicity may be set to one. The base station may be aware that averaging the blind decodes and CCEs over a number of slots reduces UE power consumption. Therefore, the base station can select the first search space configuration to reduce UE power consumption.

According to aspects of the present disclosure, when averaging the number of blind decodes and CCEs over a number of slots, a limit may not be placed on a number of blind decodes and CCEs specified for one slot. In other aspects, when averaging the number of blind decodes and CCEs over a number of slots, a maximum number of blind decodes and CCEs specified for one slot may be based on a maximum value specified in the 3GPP specification. In yet other aspects of the present disclosure, the maximum number of blind decodes and CCEs per slot may be indicated with the blind decodes and CCE limit indicated by UE signaling.

As indicated above, FIGS. 3A, 3B, and 4 are provided as examples. Other examples may differ from what is described with respect to FIGS. 3A, 3B, and 4.

Figure 5:
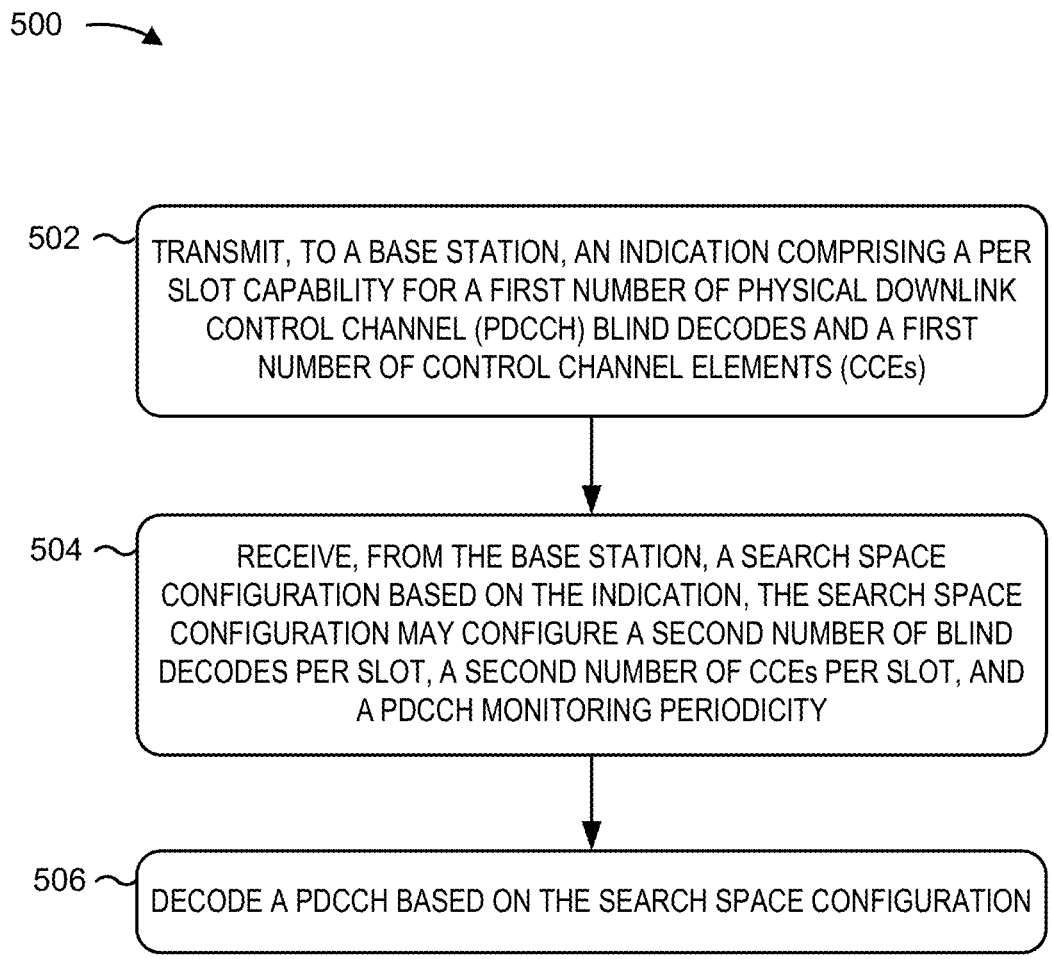
FIG. 5 is a flow diagram illustrating an example process performed, for example, by a user equipment (UE), in accordance with various aspects of the present disclosure.

FIG. 5 is a flow diagram illustrating an example process 500 performed, for example, by a user equipment (UE), in accordance with various aspects of the present disclosure. The example process 500 is an example of physical downlink control channel (PDCCH) monitoring for reduced capability (RedCap) user equipment (UE).

As shown in FIG. 5, in some aspects, the process 500 may include transmitting, to a base station, an indication comprising a per slot capability for a first number of physical downlink control channel (PDCCH) blind decodes and a first number of control channel elements (CCEs) (block 502). For example, the UE (e.g., using the antenna 252, demodulator/modulator (DEMOD/MOD) 254, TX MIMO processor 266, transmit processor 264, controller/processor 280, and/or memory 282) can transmit to a base station, an indication comprising a per slot capability for a first number of physical downlink control channel (PDCCH) blind decodes and a first number of control channel elements (CCEs). The indication may be for a maximum number of blind decodes and CCEs per slot. In other aspects, the number of blind decodes and CCEs may be less than a standardized amount for full capability UEs. In still other aspects, the indication may be for an average number of blind decodes and CCEs per time period. The time period may be based on a search space configuration. The number of blind decodes and CCEs may be selected from a predefined set of capability numbers configured for the UE.

As shown in FIG. 5, in some aspects, the process 500 may include receiving, from the base station, a search space configuration based on the indication. The search space configuration may configure a second number of blind decodes per slot, a second number of CCEs per slot, and a PDCCH monitoring periodicity (block 504). For example, the UE (e.g., using the antenna 252, DEMOD/MOD 254, MIMO detector 256, receive processor 258, controller/processor 280, and/or memory 282) can receive from the base station, a search space configuration based on the indication. The configured number of blind decodes and CCEs should be less than the values indicated by the UE.

The process 500 may include decoding a PDCCH based on the search space configuration (block 506). For example, the UE (e.g., using the antenna 252, DEMOD/MOD 254, MIMO detector 256, receive processor 258, controller/processor 280, and/or memory 282) can decode a PDCCH based on the search space configuration.

Figure 6:
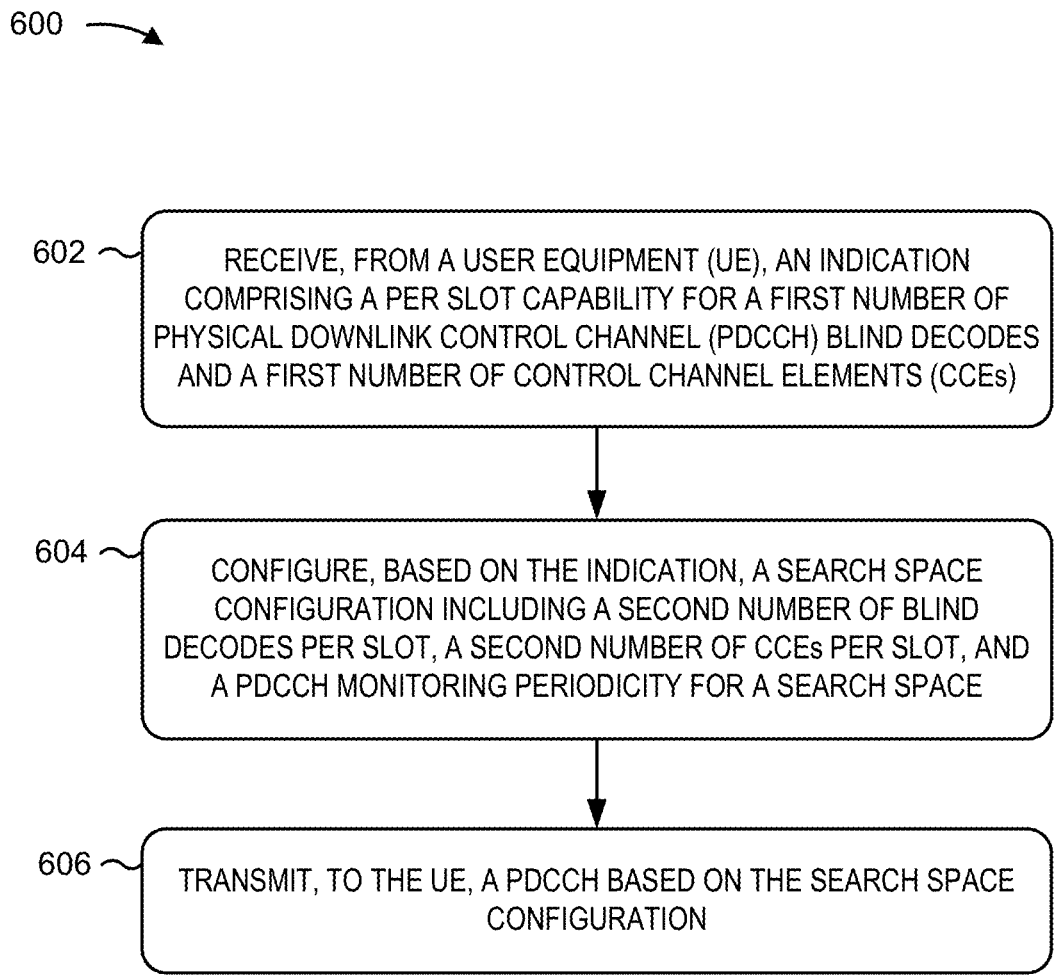
FIG. 6 is a flow diagram illustrating an example process performed, for example, by a base station, in accordance with various aspects of the present disclosure.

FIG. 6 is a flow diagram illustrating an example process 600 performed, for example, by a base station, in accordance with various aspects of the present disclosure. The example process 600 is an example of physical downlink control channel (PDCCH) monitoring for reduced capability (RedCap) user equipment (UE).

As shown in FIG. 6, in some aspects, the process 600 may include receiving, from a user equipment (UE), an indication comprising search space configuration including a per slot capability for a first number of physical downlink control channel (PDCCH) blind decodes and a first number of control channel elements (CCEs) (block 602). For example, the base station (e.g., using the antenna 234, MOD/DEMOD 232, MIMO detector 236, receive processor 238, controller/processor 240, and/or memory 242) can receive the indication from the UE. The indication may be for a maximum number of blind decodes and CCEs per slot. In other aspects, the number of blind decodes and CCEs may be less than a standardized amount for full capability UEs. In still other aspects, the indication may be for an average number of blind decodes and CCEs per time period. The time period may be based on a search space configuration.

As shown in FIG. 6, in some aspects, the process 600 may include configuring, based on the indication, a search space configuration including a second number of blind decodes per slot, a second number of CCEs per slot, and a PDCCH monitoring periodicity for a search space (block 604). For example, the base station (e.g., using the antenna 234, MOD/DEMOD 232, TX MIMO processor 230, transmit processor 220, controller/processor 240, and/or memory 242) can configure the second number of blind decodes per slot, the second number of CCEs per slot, and the PDCCH monitoring periodicity for a search space. The configured number of blind decodes and CCEs should be less than the values indicated by the UE.

The process 600 may include transmitting, to the UE, a PDCCH based on the search space configuration (block 606). For example, the base station (e.g., using the antenna 234, MOD/DEMOD 232, TX MIMO processor 230, transmit processor 220, controller/processor 240, and/or memory 242) can transmit, to the UE, a PDCCH based on the search space configuration.

Implementation examples are described in the following numbered clauses.

1. A method for wireless communication performed by a user equipment (UE), comprising:

transmitting, to a base station, an indication comprising a per slot capability for a first number of physical downlink control channel (PDCCH) blind decodes and a first number of control channel elements (CCEs);

receiving, from the base station, a search space configuration based on the indication, the search space configuration configuring a second number of blind decodes per slot, a second number of CCEs per slot, and a PDCCH monitoring periodicity; and decoding a PDCCH based on the search space configuration.

2. The method of clause 1, in which:
the PDCCH monitoring periodicity identifies a slot periodicity for attempting to decode the PDCCH;
an average of the second number of blind decodes over a number of slots is less than or equal to the first number of blind decodes;
an average of the second number of CCEs over the number of slots is less than or equal to the first number of CCEs;
the number of slots is based on the search space configuration; and
the search space configuration is one configuration of a plurality of search space configurations, each search space corresponding to a different PDCCH monitoring periodicity.

3. The method of clause 1 or 2, in which the per slot capability comprises an average number of blind decodes per time period and an average number of CCEs per time period.

4. The method of any of the preceding clauses, in which the time period is based on the search space configuration.

5. The method of any of preceding clauses 1 or 2, in which the per slot capability comprises a maximum number of blind decodes per slot and a maximum number of CCEs per slot.

6. The method of any of the preceding clauses, in which the first number of PDCCH blind decodes and the first number of CCEs are one set of UE capability numbers selected from multiple predefined sets of capability numbers configured for the UE.

7. The method of any of the preceding clauses, in which the UE is a reduced capability (RedCap) UE.

8. The method of any of the preceding clauses, in which the reduced capability UE comprises an industrial wireless sensor, a surveillance device, or a wearable device.

9. The method of any of the preceding clauses, in which:
the first number of blind decodes is less than a third number of blind decodes predefined for a full capability UE; and
the first number of CCEs is less than a third number of CCEs predefined for a full capability UE.

10. A method for wireless communication performed by a base station, comprising:
receiving, from a user equipment (UE), an indication comprising a per slot capability for a first number of physical downlink control channel (PDCCH) blind decodes and a first number of control channel elements (CCEs);
configuring, based on the indication, a search space configuration including a second number of blind decodes per slot, a second number of CCEs per slot, and a PDCCH monitoring periodicity for a search space; and transmitting, to the UE, a PDCCH based on the search space configuration.

11. The method of clause 10, in which:
the PDCCH monitoring periodicity identifies a slot periodicity for attempting to decode the PDCCH;
an average of the second number of blind decodes over a number of slots is less than or equal to the first number of blind decodes;
an average of the second number of CCEs over the number of slots is less than or equal to the first number of CCEs;
the number of slots is based on the configured search space; and
the configured search space is one configuration of a plurality of configured search spaces, each configured search space corresponding to a different PDCCH monitoring periodicity.

12. The method of clause 10 or 11, in which the per slot capability comprises an average number of blind decodes per time period and an average number of CCEs per time period.

13. The method of any of the clauses 10-12, in which the time period is based on the search space configuration.

14. The method of any of clauses 10 or 11, in which receiving the indication further comprises receiving, from the UE, a maximum capability comprising a maximum number of blind decodes per slot and a maximum number of CCEs per slot.

15. The method of any of the clauses 10-14, in which the UE is a reduced capability (RedCap) UE.

16. The method of any of the clauses 10-15, in which:
the first number of blind decodes is less than a third number of blind decodes predefined for a full capability UE; and
the first number of CCEs is less than a third number of CCEs predefined for the full capability UE.

17. An apparatus for wireless communications performed by a user equipment (UE), comprising:
a processor,
memory coupled with the processor; and
instructions stored in the memory and operable, when executed by the processor, to cause the apparatus:
to transmit, to a base station, an indication comprising a per slot capability for a first number of physical downlink control channel (PDCCH) blind decodes and a first number of control channel elements (CCEs);
to receive, from the base station, a search space configuration based on the indication, the search space configuration configuring a second number of blind decodes per slot, a second number of CCEs per slot, and a PDCCH monitoring periodicity; and
to decode a PDCCH based on the search space configuration.

18. The apparatus of clause 17, in which:
the PDCCH monitoring periodicity identifies a slot periodicity in which the processor causes the apparatus to attempt to decode the PDCCH;
an average of the second number of blind decodes over a number of slots is less than or equal to the first number of blind decodes;
an average of the second number of CCEs over the number of slots is less than or equal to the first number of CCEs;
the number of slots is based on the search space configuration; and the search space configuration is one configuration of a plurality of search space configurations, each search space corresponding to a different PDCCH monitoring periodicity.

19. The apparatus of clause 17 or 18, in which the per slot capability comprises an average number of blind decodes per time period and an average number of CCEs per time period.

20. The apparatus of any of the clauses 17-19, in which the time period is based on the search space configuration.

21. The apparatus of any of clauses 17 or 18, in which the per slot capability comprises a maximum number of blind decodes per slot and a maximum number of CCEs per slot.

22. The apparatus of any of the clauses 17-21, in which the first number of PDCCH blind decodes and the first number of CCEs are one set of UE capability numbers selected from multiple predefined sets of capability numbers configured for the UE.

23. The apparatus of any of the clauses 17-22, in which the UE is a reduced capability (RedCap) UE.

24. The apparatus of any of the clauses 17-23, in which the reduced capability UE comprises an industrial wireless sensor, a surveillance device, or a wearable device.

25. The apparatus of any of the clauses 17-24, in which:
the first number of blind decodes is less than a third number of blind decodes predefined for a full capability UE; and
the first number of CCEs is less than a third number of CCEs predefined for a full capability UE.

26. An apparatus for wireless communications performed by a base station, comprising:
a processor,
memory coupled with the processor; and
instructions stored in the memory and operable, when executed by the processor, to cause the apparatus:
to receive, from a user equipment (UE), an indication comprising a per slot capability for a first number of physical downlink control channel (PDCCH) blind decodes and a first number of control channel elements (CCEs);
to configure, based on the indication, a search space configuration including a second number of blind decodes per slot, a second number of CCEs per slot, and a PDCCH monitoring periodicity for a search space; and
to transmit, to the UE, a PDCCH based on the search space configuration.

27. The apparatus of clause 26, in which:
the PDCCH monitoring periodicity identifies a slot periodicity in which the processor causes the apparatus to attempt to decode the PDCCH;
an average of the second number of blind decodes over a number of slots is less than or equal to the first number of blind decodes;
an average of the second number of CCEs over the number of slots is less than or equal to the first number of CCEs;
the number of slots is based on the configured search space; and
the configured search space is one configuration of a plurality of configured search spaces, each configured search space corresponding to a different PDCCH monitoring periodicity.

28. The apparatus of clause 26 or 27, in which the per slot capability comprises an average number of blind decodes per time period and an average number of CCEs per time period.

29. The apparatus of any of the clauses 26-28, in which the time period is based on the search space configuration.

30. The apparatus of any of clauses 26 or 27, in which the processor causes the apparatus to receive the indication by receiving, from the UE, a maximum capability comprising a maximum number of blind decodes per slot and a maximum number of CCEs per slot.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
   transmitting, to a base station, an indication comprising a per slot capability for a first number of physical downlink control channel (PDCCH) blind decodes and a first number of control channel elements (CCEs);
   receiving, from the base station, a search space configuration based on the indication, the search space configuration configuring a second number of blind decodes per slot, a second number of CCEs per slot, and a PDCCH monitoring periodicity; and
   decoding a PDCCH based on the search space configuration.

2. The method of claim 1, in which:
   the PDCCH monitoring periodicity identifies a slot periodicity for attempting to decode the PDCCH;
   an average of the second number of blind decodes over a number of slots is less than or equal to the first number of blind decodes;
   an average of the second number of CCEs over the number of slots is less than or equal to the first number of CCEs;
   the number of slots is based on the search space configuration; and
   the search space configuration is one configuration of a plurality of search space configurations, each search space corresponding to a different PDCCH monitoring periodicity.

3. The method of claim 1, in which the per slot capability comprises an average number of blind decodes per time period and an average number of CCEs per time period.

4. The method of claim 3, in which the time period is based on the search space configuration.

5. The method of claim 1, in which the per slot capability comprises a maximum number of blind decodes per slot and a maximum number of CCEs per slot.

6. The method of claim 1, in which the first number of PDCCH blind decodes and the first number of CCEs are one set of UE capability numbers selected from multiple predefined sets of capability numbers configured for the UE.

7. The method of claim 1, in which the UE is a reduced capability (RedCap) UE.

8. The method of claim 7, in which the reduced capability UE comprises an industrial wireless sensor, a surveillance device, or a wearable device.

9. The method of claim 1, in which:
   the first number of blind decodes is less than a third number of blind decodes predefined for a full capability UE; and
   the first number of CCEs is less than a third number of CCEs predefined for a full capability UE.

10. A method for wireless communication performed by a base station, comprising:
    receiving, from a user equipment (UE), an indication comprising a per slot capability for a first number of physical downlink control channel (PDCCH) blind decodes and a first number of control channel elements (CCEs);
    configuring, based on the indication, a search space configuration including a second number of blind decodes per slot, a second number of CCEs per slot, and a PDCCH monitoring periodicity for a search space; and
    transmitting, to the UE, a PDCCH based on the search space configuration.

11. The method of claim 10, in which:
    the PDCCH monitoring periodicity identifies a slot periodicity for attempting to decode the PDCCH;
    an average of the second number of blind decodes over a number of slots is less than or equal to the first number of blind decodes;
    an average of the second number of CCEs over the number of slots is less than or equal to the first number of CCEs;
    the number of slots is based on the configured search space; and
    the configured search space is one configuration of a plurality of configured search spaces, each configured search space corresponding to a different PDCCH monitoring periodicity.

12. The method of claim 10, in which the per slot capability comprises an average number of blind decodes per time period and an average number of CCEs per time period.

13. The method of claim 12, in which the time period is based on the search space configuration.

14. The method of claim 10, in which receiving the indication further comprises receiving, from the UE, a maximum capability comprising a maximum number of blind decodes per slot and a maximum number of CCEs per slot.

15. The method of claim 10, in which the UE is a reduced capability (RedCap) UE.

16. The method of claim 15, in which:
    the first number of blind decodes is less than a third number of blind decodes predefined for a full capability UE; and
    the first number of CCEs is less than a third number of CCEs predefined for the full capability UE.

17. An apparatus for wireless communications performed by a user equipment (UE), comprising:
    a processor,
    memory coupled with the processor; and
    instructions stored in the memory and operable, when executed by the processor, to cause the apparatus:
       to transmit, to a base station, an indication comprising a per slot capability for a first number of physical downlink control channel (PDCCH) blind decodes and a first number of control channel elements (CCEs);
       to receive, from the base station, a search space configuration based on the indication, the search space configuration configuring a second number of blind decodes per slot, a second number of CCEs per slot, and a PDCCH monitoring periodicity; and
       to decode a PDCCH based on the search space configuration.

18. The apparatus of claim 17, in which:
    the PDCCH monitoring periodicity identifies a slot periodicity in which the processor causes the apparatus to attempt to decode the PDCCH;
    an average of the second number of blind decodes over a number of slots is less than or equal to the first number of blind decodes;
    an average of the second number of CCEs over the number of slots is less than or equal to the first number of CCEs;
    the number of slots is based on the search space configuration; and the search space configuration is one configuration of a plurality of search space configurations, each search space corresponding to a different PDCCH monitoring periodicity.

19. The apparatus of claim 17, in which the per slot capability comprises an average number of blind decodes per time period and an average number of CCEs per time period.

20. The apparatus of claim 19, in which the time period is based on the search space configuration.

21. The apparatus of claim 17, in which the per slot capability comprises a maximum number of blind decodes per slot and a maximum number of CCEs per slot.

22. The apparatus of claim 17, in which the first number of PDCCH blind decodes and the first number of CCEs are one set of UE capability numbers selected from multiple predefined sets of capability numbers configured for the UE.

23. The apparatus of claim 17, in which the UE is a reduced capability (RedCap) UE.

24. The apparatus of claim 23, in which the reduced capability UE comprises an industrial wireless sensor, a surveillance device, or a wearable device.

25. The apparatus of claim 17, in which:
the first number of blind decodes is less than a third number of blind decodes predefined for a full capability UE; and
the first number of CCEs is less than a third number of CCEs predefined for a full capability UE.

26. An apparatus for wireless communications performed by a base station, comprising:
a processor,
memory coupled with the processor; and
instructions stored in the memory and operable, when executed by the processor, to cause the apparatus:
to receive, from a user equipment (UE), an indication comprising a per slot capability for a first number of physical downlink control channel (PDCCH) blind decodes and a first number of control channel elements (CCEs);
to configure, based on the indication, a search space configuration including a second number of blind decodes per slot, a second number of CCEs per slot, and a PDCCH monitoring periodicity for a search space; and
to transmit, to the UE, a PDCCH based on the search space configuration.

27. The apparatus of claim 26, in which:
the PDCCH monitoring periodicity identifies a slot periodicity in which the processor causes the apparatus to attempt to decode the PDCCH;
an average of the second number of blind decodes over a number of slots is less than or equal to the first number of blind decodes;
an average of the second number of CCEs over the number of slots is less than or equal to the first number of CCEs;
the number of slots is based on the configured search space; and
the configured search space is one configuration of a plurality of configured search spaces, each configured search space corresponding to a different PDCCH monitoring periodicity.

28. The apparatus of claim 26, in which the per slot capability comprises an average number of blind decodes per time period and an average number of CCEs per time period.

29. The apparatus of claim 28, in which the time period is based on the search space configuration.

30. The apparatus of claim 26, in which the processor causes the apparatus to receive the indication by receiving, from the UE, a maximum capability comprising a maximum number of blind decodes per slot and a maximum number of CCEs per slot.

* * * * *